United States Patent [19]
Ragout et al.

[11] Patent Number: 5,518,034
[45] Date of Patent: May 21, 1996

[54] FLEXIBLE HOSE WITH A VISIBLY DEFORMABLE STRUCTURE UPON AN INTERNAL FAILURE WITHIN THE HOSE

[75] Inventors: Bernhard Ragout, Aubiere; Charles Moreau, Blanzat; David Mayau, Tallende, all of France

[73] Assignee: Caoutchouc Manufacture et Plastiques, Versailles Cedex, France

[21] Appl. No.: 205,271

[22] Filed: Mar. 2, 1994

[30] Foreign Application Priority Data

Mar. 3, 1993 [FR] France ............................ 93 02557

[51] Int. Cl.⁶ .......................... F16L 11/12; F16L 55/00
[52] U.S. Cl. ...................... 138/104; 138/103; 138/109
[58] Field of Search ................................. 138/103, 104, 138/177, 178, 109

[56] References Cited

U.S. PATENT DOCUMENTS

| | | | |
|---|---|---|---|
| 3,717,180 | 2/1973 | Ambrose et al. | 138/153 |
| 4,110,061 | 8/1978 | Gerritsen . | |
| 4,153,079 | 5/1979 | Ambrose | 138/104 |
| 4,225,158 | 9/1980 | Puechavy . | |
| 4,259,553 | 3/1981 | Tanaka et al. | 138/104 |
| 4,259,992 | 4/1981 | Kramer | 138/109 |
| 4,349,049 | 9/1982 | Silvey | 138/104 |
| 4,465,105 | 8/1984 | Slater | 138/109 |
| 4,467,835 | 8/1984 | Champleboux . | |
| 4,509,558 | 4/1985 | Slater | 138/104 |
| 4,554,650 | 11/1985 | Brown et al. | 138/104 |
| 4,567,916 | 2/1986 | Antal et al. | 138/109 |
| 5,244,016 | 9/1993 | Kuroda et al. | 138/103 |

FOREIGN PATENT DOCUMENTS

| | | |
|---|---|---|
| 1373301 | 10/1963 | France . |
| 1320508 | 6/1973 | United Kingdom . |
| 2018936 | 10/1979 | United Kingdom . |

Primary Examiner—James E. Bryant, III
Attorney, Agent, or Firm—Nils H. Ljungman & Associates

[57] ABSTRACT

A flexible hose which makes possible the early visual detection of a malfunction, can have a structure which allows a localized deformation in specified zones. This structure can have a combination of at least one radial expansion zone, and at least one compensation zone, wherein a localized deformation can occur as soon as the leak pressure of the leaking fluid reaches a threshold value which is only a fraction of the operating pressure of the fluid being transported through the hose.

20 Claims, 7 Drawing Sheets

FLEXIBLE HOSE WITH A VISIBLY DEFORMABLE STRUCTURE UPON AN INTERNAL FAILURE WITHIN THE HOSE

BACKGROUND OF THE INVENTION

1. Field of the Invention

This invention generally relates to the field of the transport of fluids, and in particular to the transport of polluting or even hazardous fluids which need to be kept out of the surrounding environment. More specifically, the present invention is concerned with the field of offshore oil exploration, and the tubes used for transporting the oil from an offshore oil platform to a distant loading area.

2. Background Information

The invention relates in particular to the flexible tubes used to establish high-capacity connections between loading or unloading points for petroleum products and tanker vessels. Flexible tubes used for such transport of petroleum products are subjected to mechanical fatigue stresses on account of the ocean swells and the movements of the vessels, that is any relative movement between the oil platform and the vessel being loaded. Such stresses are exacerbated by the aging which results from their continuous use in a marine environment.

In essence, over time, a problem therefore arises as to when such an oil carrying hose will rupture and allow oil to escape into the surrounding seawater. One remedy for such risks has therefore been directed to establishing a system for the visual detection of a failure within the hose before the hose actually ruptures, so that the hose can be replaced as quickly as possible. In this direction, it has therefore been proposed that a secondary reinforcement be installed along a portion of the length of the flexible hose, which secondary reinforcement can intervene in the event of a failure of the principal reinforcement. The secondary reinforcement can then be configured in a manner which visually shows that a rupture has occurred in the primary layer.

Such a solution is disclosed in French Patent No. 2 524 116 (Dunlop), which corresponds to U.S. Pat. No. 4,509, 558. This solution teaches that in the event of a failure of the principal reinforcement, the pressure of the fluid being transported causes a localized radial swelling of the secondary reinforcement due to the elongation of the material of the secondary reinforcement. Such swellings make it possible to detect the failing hose by means of a visual inspection, before any ruptures occur, and thus preventing any leakage into the surrounding environment. Nevertheless, the desired effect of the localized deformation of the secondary reinforcement in this proposed solution is not altogether satisfactory.

In the solution proposed by Dunlop, when the secondary reinforcement is elongated, the resulting radial expansion is proportional to the leak pressure of the fluid. Thus, if the leak pressure is only a fraction of the operating pressure, such as might be the case for a relatively small leak, i.e., a small hole in the primary reinforcement, the resulting radial expansion is only a fraction of the maximum expansion, and therefore it becomes more difficult to detect a failure if the failure is relatively minor. The proposed measure is therefore effective only if the leak pressure is close to the operating pressure, such as might be the case for relatively large leaks, i.e., large holes or ruptures of the primary reinforcement, so that the radial expansion is close to the maximum value.

Another factor which reduces the benefit of such a known solution is that the radial expansion of the hose entails a corresponding reduction in the length of the hose. This reduction in length therefore means that it is necessary to use hoses which are longer than the distance between the elements to be connected, so that if a rupture were to occur the radial expansion and corresponding length reduction would not make the hose too short for use.

The present invention therefore relates to a flexible hose having two coaxial reinforcements, the outermost of which is designated as a safety reinforcement and essentially provides the confinement of any fluid which may have leaked through the failed principal reinforcement, wherein a set of localized deformations of the flexible hose makes it possible to identify a leakage in the hose by a visual inspection of the outside of the hose.

OBJECT OF THE INVENTION

The object of the present invention is to remedy the deficiencies of the realizations of the known transport hoses, by making the localized deformations of the flexible hose independent of, that is, at least above a certain threshold of, the pressure of the fluid which has leaked through the principle reinforcement, while also keeping the length of the flexible hose constant. It is further desirable that this objective be achieved by means of optimal localized radial and longitudinal deformations, which can essentially provide a reliable and early visual detection of a failure of the hose.

SUMMARY OF THE INVENTION

The present invention is therefore a flexible hose having at least two reinforcement layers, and which hose is configured such that early visual detection of a failure therein is possible. The wall of the flexible hose, in the cylindrical body, from its innermost part to its outermost part, can preferably be made up of at least: a sealed lining, a principal reinforcement, an intermediate layer to separate the reinforcements, a lifting pad, a confinement layer, a safety reinforcement, an intermediate lifting pad and a peripheral covering. It is preferable that the structure of the secondary reinforcement be configured for allowing a localized deformation in specified zones of the hose, wherein at least one of the zones is a zone of radial expansion.

The present invention is characterized by the fact that the safety reinforcement can preferably be coaxial to the principal reinforcement, over essentially the entire length of the safety reinforcement, and whereby the safety reinforcement can be held at a distance from the primary reinforcement, at least in the cylindrical body of the hose, by a lifting pad having low cohesion to the primary reinforcement layers. It is also preferable that the tear strength of the lifting pad be no greater than about 5 bars, and that the adherence of the lifting pad to the adjacent components, or layers, with which it is in contact is not greater than about 5 deca-newtons per centimeter (daN/cm) of width.

The hose of the present invention can also be characterized by the fact that the flexible hose has at least one compensation zone for compensating in reduction in length of the hose due to radial expansion thereof. The plies of the safety reinforcement in this compensation zone preferably have a differential laying angle, in relation to the equilibrium angle, of between about −2 and about +12 degrees.

In addition, the hose can be further characterized by the fact that the localized deformation occurs as soon as the leak pressure of the fluid which has leaked through the failing principal reinforcement reaches a threshold value, which threshold value can preferably be only a fraction of the normal operating pressure for pumping fluids through the hose.

In summary, one aspect of the invention resides broadly in a flexible, fluid-transporting hose for the transport of fluids therethrough in a predetermined range of fluid pressures, the flexible hose comprising: a first liner device defining a fluid passage through the hose; a second liner device disposed circumferentially about the first liner device; the second liner device comprising a containment liner device for containing fluid under pressure leaking through the first liner device, the second liner device comprising an outer diameter; the second liner device comprising a structure for permitting deformation of at least a portion of the second liner device, upon leakage of fluid through the first liner device, to increase the outer diameter of the at least a first portion of the second liner device; the first liner device and the second liner device having an adherence to one another, the adherence being in a range of adherence values; and the range of adherence values comprising adherence values for permitting separation of the second liner device from the first liner device at a leakage pressure substantially less than the fluid pressures within the predetermined range of fluid pressures.

One additional aspect of the invention resides broadly in a flexible, fluid-transporting hose for the transport of fluids therethrough in a predetermined range of fluid pressure, the flexible hose having a length, the flexible hose comprising: a first liner device defining a fluid passage through the hose; a second liner device disposed circumferentially about the first liner device; the second liner device comprising a containment liner device for containing fluids leaking under pressure through the first liner device; the second liner device having a base configuration in the absence of fluids leaking through the first liner device; the second liner device comprising a reinforcement device for reinforcing the containment liner device; the reinforcement device having at least one first portion, the at least one first portion being configured for permitting radial expansion of the second liner device, along the at least one first portion, upon leakage of fluid under pressure through the first liner device; and the reinforcement device having at least one second portion, the at least one second portion comprising device for maintaining the length of the flexible hose substantially constant upon leakage of fluid under pressure through the first liner device.

BRIEF DESCRIPTION OF THE DRAWINGS

The invention and several of its variants are explained in greater detail below and with reference to the accompanying drawings, in which.

DESCRIPTION OF THE PREFERRED EMBODIMENTS

Figure 1:
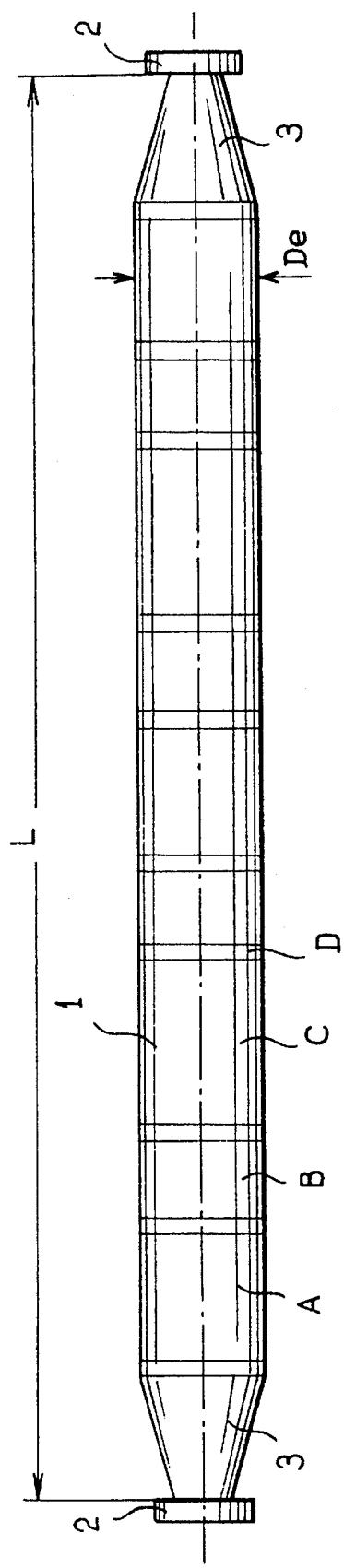
FIG. 1 shows a lateral elevation of a flexible hose, under normal operating conditions.

FIG. 1 shows, in the form of a lateral elevation, a flexible hose in accordance with the present invention under normal operating conditions, in other words, in the absence of any failure of the principal reinforcement. The cylindrical body 1 of the flexible hose preferably has zones (A, B, C, D), all of which have essentially the same diameter when the flexible hose is operating without leaks. Individual sections of flexible tubes can preferably be connected to one another, on one hand, and to the loading/unloading points or to the vessels on the other hand, by means of transient connecting zones 3. These connection zones 3 can preferably have a generally tapered shape from the cylindrical body 1 to the flanges 2 which can provide the connection elements of the flexible tubes. An assembly of such tubes can thereby form a working line from an unloading point to a loading point.

Figure 3:
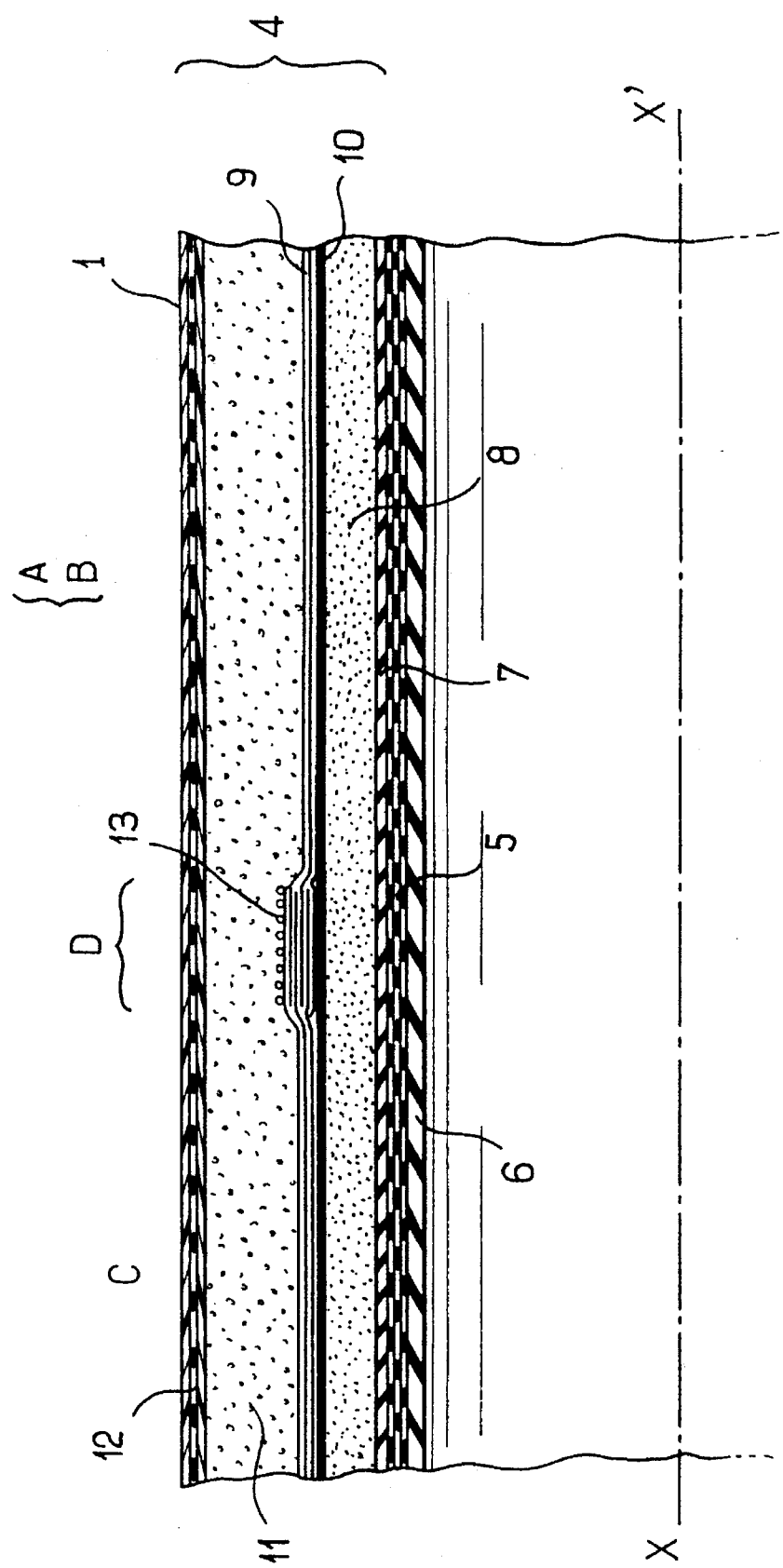
FIG. 3 shows a partial longitudinal section of a flexible hose, such as the flexible hose of FIG. 1, including a connection zone of the safety reinforcement between a radial expansion zone and a compensation zone.

The cylindrical body 1, like the transient connecting zones 3 preferably has, in a manner as shown in FIG. 3, the components of a flexible hose, about which components, a peripheral covering 12 can preferably be placed. Such a covering can be constructed to provide protection for the hose, and can also serve as a location onto which the manufacturer's name or logo can be placed, and for the identification of the flexible hose.

Figure 2:
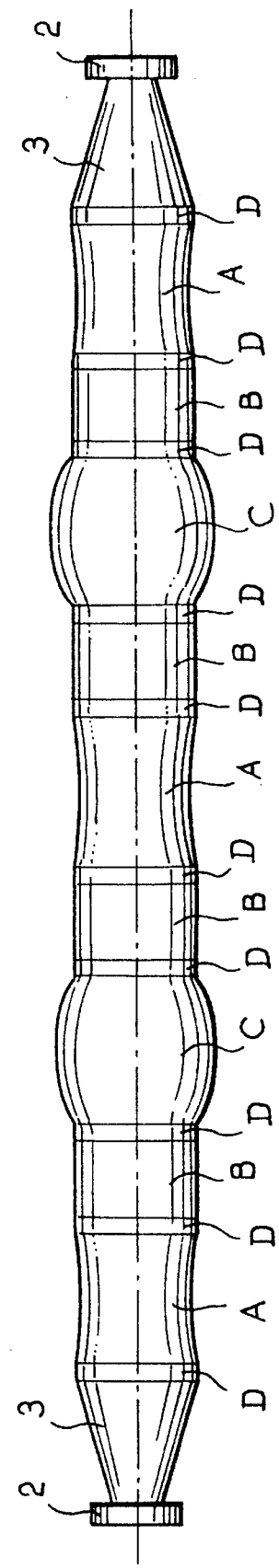
FIG. 2 shows a similar lateral elevation of the flexible hose of FIG. 1, but shows a failed condition of the hose and the visual contrast provided by radial expansion of zones of the hose and compensation by adjacent hose zones.

FIG. 2 shows an elevation of the flexible hose as shown in FIG. 1, as such a hose would generally appear in the event of a failure of the principal reinforcement. Such a failure of the principal reinforcement would generally be considered a break in the integrity of the principal reinforcement, which allows the fluid being transported through the hose to leak through. Under conditions of such a failure, FIG. 2 depicts the various types of localized deformations of the hose which make possible a visual detection of a failed hose segment.

The particular advantage of the structure of the flexible hose in accordance with the present invention resides in the ability for detection of leakage of fluid at low leakage pressures (Pf), due to a low cohesion of a lifting pad 8, disposed about the principal reinforcement. This low cohesion essentially allows portions, or essentially adjoining layers of the hose to separate from one another and thereby permit, for example, radial expansion of the exterior portions of the hose. Because of this change in shape, an early detection of the failure of the tubes can visually be made.

In accordance with the present invention, a safety reinforcement 9 can be provided about the lifting pad 8 for containing any leakage of the principal reinforcement. Thus, any accumulation of fluid leaking into the space between the principal reinforcement 5 and the safety reinforcement 9, under the action of the leak pressure (Pf), an preferably cause a set of localized deformations which can preferably reach an optimal amount of deformation, that is a visible change in the exterior of the tubing, once the leak pressure (Pf) reaches a threshold value (Vs). In accordance with the present invention, this threshold value (Vs) can preferably be only a fraction of the operating pressure (Pa) of the flexible hose.

In one preferred embodiment of the present invention, the optimal visual detection can occur for a leak pressure (Pf) which is only about one-quarter of the operating pressure (Ps). This can essentially be achieved because of a special arrangement of pairs of corded plies constituting the safety reinforcement 9, and also because of the low cohesion of the lifting pad 8.

The present variant of the flexible hose, as shown in FIGS. 1 and 2, shows, in addition to the transient connecting zones 3, two radial expansion zones (C), four dimensionally invariant zones (B), and three contractile zones (A). Each of these zones (A, B, C) can preferably be connected to its adjacent zones by means of a connecting zone (D). It should generally be understood that the number and positioning of such zones can be varied, and any variation in such would be well within the skill of the artisan.

Under the action of the leak pressure (Pf), there can preferably be a localized radial expansion in the zones (C) and a corresponding radial contraction in the contractile zones (A). The dimensionally invariant zones (B) can provide a sort of buffer between the expanding and contracting zones, preferably by providing a better distribution of the stresses among these antagonistic deformations. The connecting zones (D) can preferably be designed to ensure the progressive nature of the special characteristics of the safety reinforcement from one zone to an adjoining zone.

The value of the expansion ratio of the radial expansion zone (C) can, for example, be about 1.3 times the threshold value (Vs) and can preferably be independent of the leak pressure (Pf), between the threshold value (Vs) and the operating pressure (Ps). Simultaneous to the expansion in the zone (C), the outside diameter of the contractile zone (A) is reduced. The result can also be an accentuated contrast between the enlarged diameter of the radial expansion zones (C) and the reduced diameter of the contractile zones (A), thereby preferably increasing the visual effect of the deformation of the flexible hose.

The present invention teaches that the different zones (A, B, C) can have different coefficients of dimensional variation under the effect of the leak pressure (Pf). The present invention uses these different coefficients to an advantage in order to obtain an accentuation of the visual effect as discussed above, and to compensate for the longitudinal dimensional reduction of the radial expansion zones (C), which compensation can result from the elongation of the contractile zones (A). The dimensionally invariant zones (B) can compensate for the axial forces resulting from the longitudinal variations of the zones (A or C), without modifications of the dimensions of the zones (B).

As mentioned briefly above, the arrangement of different zones of the cylindrical body (1), as depicted in FIGS. 1 and 2, represents only one embodiment of the present invention. The number, length, distribution and relative positioning of the different types of zones can vary as a function of the requirements of a particular application. In essence, the minimum arrangement, in accordance with the present invention, can have one radial expansion zone (C), one contractile zone (A), with a corresponding connecting zone (D). In this arrangement, the length of the dimensionally invariant zones (B) can essentially be considered to be zero. Further, in order to provide a simplified connection of the hose of the present invention, the hose could also be provided with connection devices at the ends thereof, such as the transient connecting zones 3.

FIG. 3 shows, in a partial longitudinal section, in relation to the axis (X—X), the internal structure of one embodiment of a flexible hose in accordance with the present invention. The view as depicted in FIG. 3 is essentially taken in the region of the cylindrical body 1, and shows one possible arrangement of the safety reinforcement in a connecting zone (D).

From its innermost layer, that is, starting from the longitudinal axis (X—X) and proceeding to its peripheral layer, the wall 4 of the flexible hose can comprise, preferably arranged coaxially, a sealed inner lining 6 in contact with the fluid being transported, a principal reinforcement 5, an intermediate layer 7 to separate the reinforcements, a lifting pad 8, then a safety reinforcement 9 protected by a confinement layer 10 located on its surface facing the lifting pad 8, an intermediate lifting lining 11 made of compact or cellular material, and a peripheral covering 12 for protecting all the components of the wall from the outside environment. In essence, some of the above-listed components may not be needed for some particular purposes of such a hose, and variations of the components would be well within the skill of an artisan, while staying within the context of the present invention. As such, since the concept of the present invention is essentially focused on the two reinforcement layers and the lifting layer disposed therebetween, the other components listed above could be varied to fill the required need for particular situations.

The sealed inner lining 6 can preferably be made from a specially-formulated compact elastomer compound which should preferably be chemically inert in relation to the fluid being transported by the hose. Preferably, with the view towards carrying petroleum products, the basic elastomer of the elastomer compound could preferably be a butadiene-acrylonitrile copolymer, alone or possibly in combination with another elastomer.

As discussed above, the next outer layer of a hose in accordance with the present invention can preferably be the principal reinforcement layer. The purpose of the principal reinforcement 5 is essentially to provide the flexible hose with mechanical strength under operating conditions, or to support the inner lining 6. Such a reinforcement layer can preferably be formed from at least one pair of intersecting corded plies, preferably having a high modulus of elasticity. Such corded plies could preferably be metal cord or aromatic polyamide cords, and can be oriented at a laying angle close to the equilibrium angle, which makes it possible to keep the dimensional characteristics of the flexible hose exposed to the service pressure (Ps) constant. As generally known, the equilibrium angle for such plies can essentially be considered to be about 54° with respect to the longitudinal axis of the hose, or alternately, 36° with respect to a diametral plane, that is, a plane cutting perpendicularly through the hose.

In one possible embodiment of the pair of corded plies, a first ply could possibly have its cords disposed at about 54° with respect to the longitudinal axis, and the second ply could be disposed preferably directly under the first ply, with the cords of the second ply disposed at about 126°, as measured in the same angular direction with the cords of the first ply. In essence, a measurement of about 126°, when measured from the opposite direction is also about 54° with respect to the longitudinal axis. An alternative embodiment of the present invention could have the cords of each ply interwoven with the cords of the other ply, at the angles discussed above.

The next layer as discussed above, can preferably be an intermediate reinforcement separation layer 7. In essence, this separation layer 7 can provide the link, on one hand with the principal reinforcement 5, and on the other hand with the lifting lining 8. This separation layer 7 can preferably be made of a compact elastomer compound, preferably based on natural or synthetic polyisoprene, and can preferably adhere in the form of a physico-chemical bond to the two adjoining components, that is, the principal reinforcement 5 and the lifting lining 8.

The lifting lining 8, can essentially be configured such that the principal characteristic of the lining 8 is that it preferably has a low cohesion. This lifting lining 8 can preferably be made of a compact material for when the flexible hose is to be used away from water, or for use under "sub-marine", i.e. submerged conditions, or alternatively can be made from buoyant material, when the flexible hose is to be used substantially along the surface of water. When the lifting lining 8 is made of a compact material, it can, in one alternative, be made of a fabric, which can be untreated, or coated by a substance which locally prevents adherence of the lining 8 to the components with which it is in contact, thereby making possible the creation of a partial zone of reduced strength at the interfaces of the lining 8. Alternatively, the lining 8 can be made of a thin film having the same properties as mentioned for the fabric coating. Such a thin film could preferably be made from at least one of the following, to cite several non-restricting examples, a polyethylene, polypropylene or polyester film. Likewise, polyethylene, polypropylene or polyester could be used to coat the fabric.

When the lifting lining 8 is to be buoyant, the lining 8 can preferably be made from a cellular material having a specific gravity of less than 100 kg/m$^3$, and preferably between 30 and 70 kg/m$^3$. Such a material can preferably act as a supplement to the intermediate lifting pad 11, which would then, in the case where the hose is to be buoyant, also be made of a cellular material to provide the required amount of buoyancy for the hose. It should generally be known, that if the inner hose provides sufficient buoyancy for a hose, the lifting pad 11 could be omitted or constructed of an alternative material.

The next layer, in the described embodiment of FIG. 3, is a confinement layer 10 which can preferably be placed outwardly of the lifting lining 8, before the safety reinforcement 9. This lining 8 can preferably form an adhesive physico-chemical connection between the lining 8 and the reinforcement 9. In the event of a failure of the principal reinforcement 5, the lining 8 is provided so that it is possible to again confine the fluid, without yet involving the dimensional variations of the radial expansion zones (C) or the contractile zones (A).

Oriented coaxially with the lifting lining 8 and the confinement layer 10, the safety reinforcement 9 can preferably be disposed so as to be axially continuous from one flange 2 at one end of the flexible hose to another flange 2 at the other end. This safety reinforcement 9 can thereby essentially completely surround the principal reinforcement 5, from which it is separated, as discussed above, except in the transient connecting zones 3, by the lifting lining 8.

The safety reinforcement 9, which comprises an essential element of the present invention, can preferably be constituted by at least one pair of interesting corded plies, similar to the reinforcement 5, but preferably oriented as spiral windings at different laying angles in relation to the variable equilibrium angle as discussed above. The different laying angles of the cords of the reinforcement 9 can preferably be oriented to create successive zones which exhibit specific behaviors in relation to the mechanical stresses induced by the leak pressure (Pf) in the event of a failure of the principal reinforcement 5.

A further representation of the angles discussed herebelow can also be seen in FIGS. 4 and 4A, while the discussion of FIGS. 4 and 4A, as found further hereinbelow will reinforce the discussion that immediately follows.

In accordance with the present invention, the differential laying angle of the pairs of corded plies which constitute the safety reinforcement 9 are provided at angles which can preferably differ, as a function of the individual zones, by plus or minus about 12° from the equilibrium angle. Thus, if the equilibrium angle were considered to be about 54° with respect to the longitudinal axis of the hose, the laying angles of the cords of the reinforcement 9 would essentially be within the range of about 42° to about 66° with respect to the longitudinal axis of the hose.

In this context, when the differential laying angle assumes values between about −12 and about −3 degrees from the equilibrium angle, (in other words, about 42° to about 51° with respect to the longitudinal axis) a radial expansion zone (C) is created in the wall (4) of the flexible hose. And, when the differential laying angle assumes values between about +3 and about +12 degrees from the equilibrium angle, (in other words, about 57° to about 66° with respect to the longitudinal axis) a contractile zone (A) is created.

When the differential laying angle assumes values between about −2 and about +2 degrees from the equilibrium angle, (in other words, about 52° to about 56° with respect to the longitudinal axis) a dimensionally invariant zone (B) is created, which should essentially be understood, as this zone has plies essentially disposed at the equilibrium angle, which angle is generally known to be the angle at which dimensional variations typically will not occur.

The necessary continuity of the safety reinforcement 9 requires the connection, in the connecting zones (D), of the pairs of intersecting plies which constitute it, to thereby essentially guarantee the mechanical transmission of forces from one zone to the other. The length of this connecting zone (D) can essentially be said to be the length of the connection itself.

It is technically simpler to realize the connection of intersecting plies whose differential laying angles are closer to one another, i.e. to connect the intersecting plies of a radial expansion zone (C) or of a contractile zone (A) to those of a dimensionally invariant zone (B), than to connect the plies of a zone (C) to the plies of a zone (A). The connecting zones (D) can thus be considered junction zones, by overlapping ply on ply, between the plies of the safety reinforcement 9 of two consecutive zones. In the connection zones (D), above the upper ply of the connection, there can also preferably be a transversal reinforcement 13. This transversal reinforcement 13 can preferably also be made from cords, e.g. textile cords, which can preferably be oriented orthogonally to the longitudinal axis (X—X) of the flexible hose and can be embedded in the intermediate lifting pad (11). In this context, it can be seen that the reinforcement 13 is provided to maintain the cohesion of the different plies of adjacent zones (A, B, C). In other words, the cords of the reinforcement zone 13 essentially wrap around and hold preferably together the plies of adjoining zones (A, B, C).

The safety reinforcement 9 can then be surrounded by an intermediate lifting pad 11, the material of which can be compact or cellular, depending on whether the flexible hose is designed for use away from water, or in the submersible or floating version.

In the context of carrying petroleum products through seawater, the outside diameter (De) of the flexible hose, as well as the thickness and the density of the constituent elements of the wall 4 can be adapted, as a function of the specific density of the fluid being transported and the density of the seawater, to provide a functional buoyancy which is either positive if it is desired that the flexible hose be a floating hose, or negative if it is desired that the hose be a submersible hose.

For positive functional buoyancy, the intermediate lifting pad 11 can be made of a cellular material having a low density, e.g. from 30 kg/m$^3$ to 70 kg/m$^3$.

For utilization in a submersible version, the intermediate lifting pad 11 can preferably be made of a sheet of a compact elastomer compound.

The outermost component of the wall 4 can generally be provided as a peripheral covering 12, which can be connected by means of physico-chemical adherence to the intermediate lifting pad 11. In essence, the purpose of this covering 12 is to protect the assembly of components against corrosion from the outside environment, impacts and abrasion, as well as from the risk of contamination and aging when the hose is used in a marine environment. For use in a marine environment, the outside covering can preferably be made from an elastomer compound, which elastomer compound can preferably be based on a polychloroprene elastomer. It may also be desirable that the outside covering 12 have an additional reinforcement, such as textile or metal reinforcements, in the form of continuous or discontinuous wires or plies, to provide greater mechanical strength from the exterior.

Figure 4:
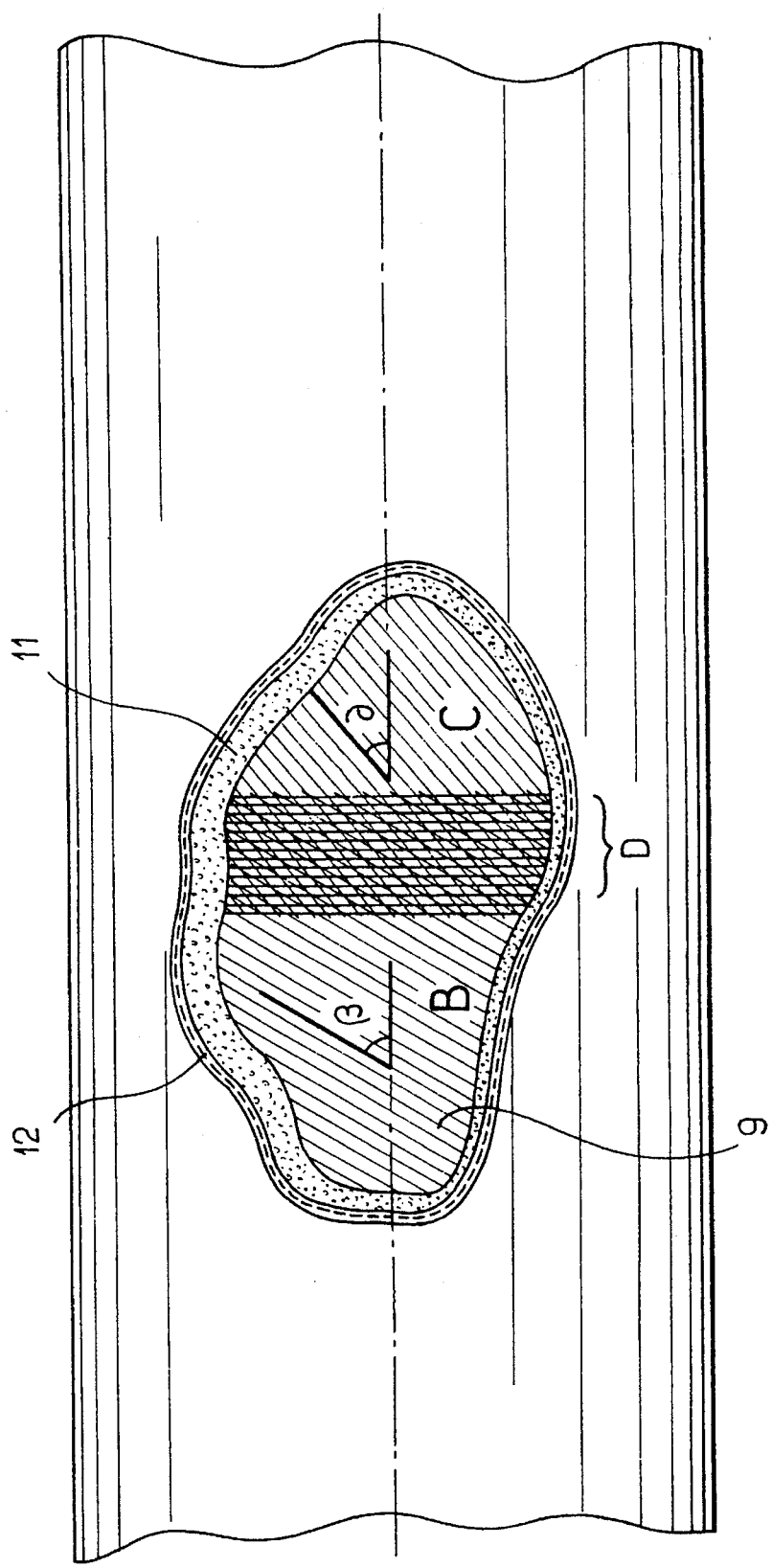
FIG. 4 shows a "peeled away" view of one embodiment of a flexible hose in accordance with the present invention, including a schematic diagram of the laying angles of the plies of the safety reinforcement layer, in a radial expansion zone and in a connecting zone.
Figure 4A:
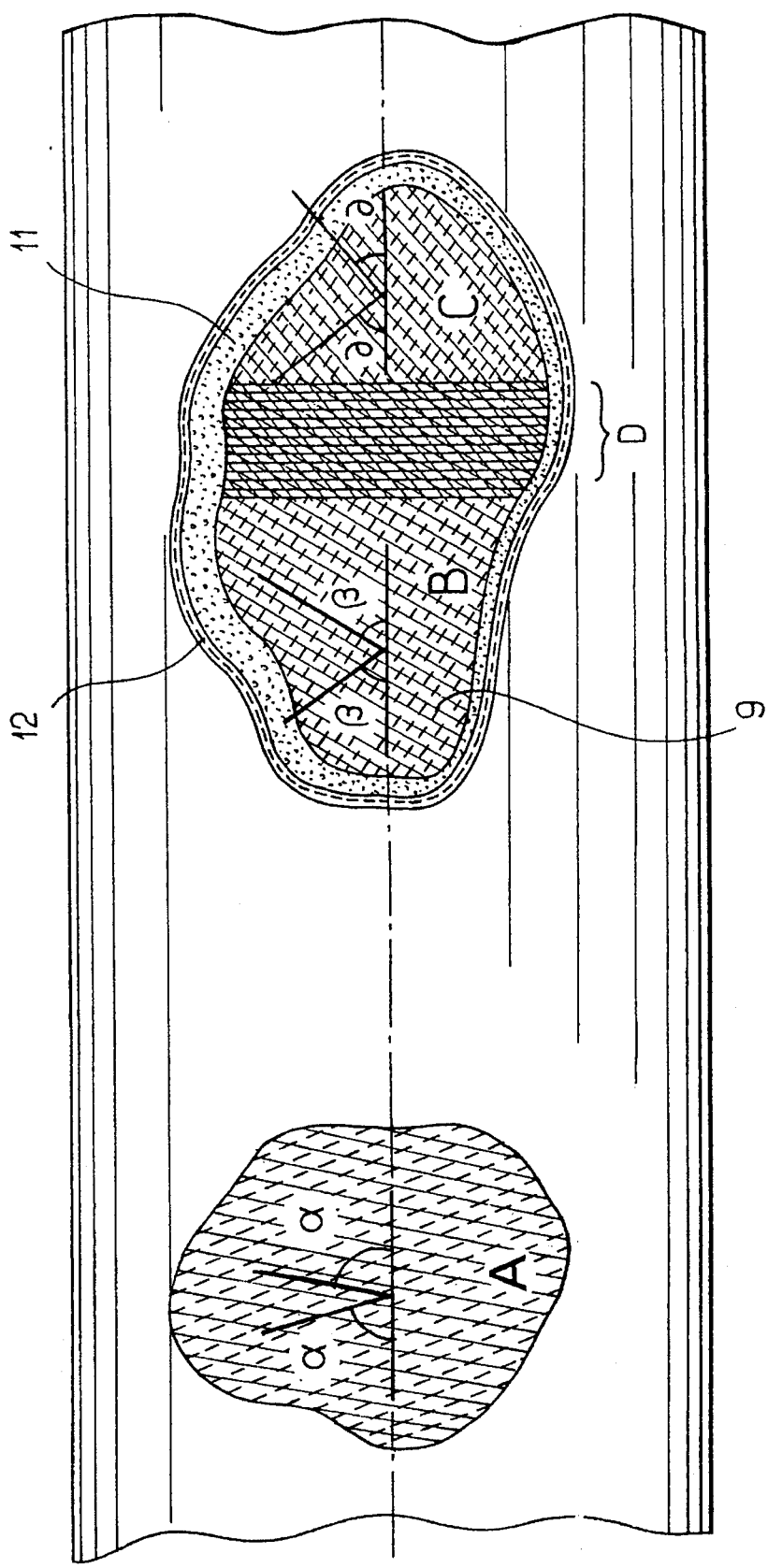
FIG. 4A shows a view similar to that of FIG. 4, but also includes a compensation zone and shows, diagrammatically, the second ply of the pair of plies of the safety reinforcement layer.

FIGS. 4 and 4A show "peeled back" views of the wall of one embodiment of a flexible hose in accordance with the present invention. Each of these figures illustrates the orientation of the intersecting plies of the safety reinforcement 9, in the radial expansion zones (C), the dimensionally invariant zones (B), the radial contraction zones (A) and the connecting zones (D).

Below the peripheral covering 12 and the intermediate lifting pad 11, FIG. 4 shows angles de pose (beta), in the dimensionally invariant zone (B), and (delta), in the radial expansion zone (C) of the plies which constitute the safety reinforcement (9), while FIG. 4A shows (alpha) in the radial contraction zone (A).

In the dimensionally invariant zone (B), the differential laying angle (beta) should preferably be between about −2 and about +2 degrees from the equilibrium angle, which can have the consequence of keeping both the radial and axial dimensions of the flexible hose in the zone (B) constant, when the leak pressure (Pf) is exerted.

In the radial expansion zone (C), the differential laying angle (delta) can preferably be between about −12 and about −3 degrees from the equilibrium angle, which can have the effect of causing an expansion in the radial direction, accompanied by a reduction of length in the longitudinal direction. As a result of the transmission of forces by the intermediate lifting pad 11 to the peripheral covering 12, the radial expansion of the zone (C) is manifested, on the surface of the flexible hose, preferably by a swelling which can make possible an easy visual detection of a failure in the hose.

Inversely, in the contraction zone (A) where the differential laying angle (alpha) can preferably be between about +3 and about +12 degrees from the equilibrium angle, there can be a radial contraction, accompanied by a longitudinal elongation which is manifested, on the surface of the flexible hose, by a diameter reduction which can emphasize the visual effect of the swelling in the radial expansion zones (C).

This concept can further be understood, if one considers that under normal hose usage, the ends of hose segments are essentially held in a fixed relationship by the unchanging configuration of the safety reinforcement 5. Then, since the ends of the reinforcement 9 are essentially rigidly affixed in relation to the fixed length of the reinforcement 5, a contraction of the length in the zones (C) can thereby result in a pulling of the hose between ends, which pulling can result in the elongation of the zones (A).

The dimensional variations of the radial expansion zones (C) and of the contractile zones (A) can essentially occur once the leak pressure (Pf) reaches the threshold value (Vs), and thus can make possible an early detection of a failure in the hose. These effects can be due, on one hand, to the differential between the laying angles of the cords of the safety reinforcement 9, and, on the other hand, to a preferably low cohesion of the lifting lining 8, the tear strength of which preferably does not exceed 5 bars and whose adherence to the elements with which it is in contact does not exceed 5 daN/cm of width.

Each zone which experiences a dimensional variation under the effect of the leak pressure (Pf) can preferably be associated, via a connecting zone (D) of short length, with a dimensionally invariant zone (B).

This preferential orientation can essentially make possible an improved distribution of the forces, by establishing a progressive connection between the negative value of the differential laying angle of the safety reinforcement 9 in the radial expansion zone (C) and the positive value of the differential laying angle of the safety reinforcement 9 in the contractile zone (A). This improved distribution essentially arises from the connections which can be made, in each case, between intersecting plies which have an extreme value, positive or negative, of the differential laying angle and those having a value close to zero of the differential laying angle and are located in the dimensionally invariant zone (B).

Whether or not this preferential orientation is adopted, the combination, in the axial direction, of the radial expansion zones (C), the contractile zones (A) and the dimensionally invariant zones (B) can produce the visual effect of swelling and collapse of the flexible hose, and essentially without a modification of the length of the hose between flanges 2. In other words, the shortening of the radial expansion zones (C) is compensated by the elongation of the contractile zones (A).

The orientations of the constituents of the wall 4 of the flexible hose as described above are those of one possible embodiment of the body of the flexible hose in the cylindrical body 1.

In the transient connecting zones 3, which can preferably have a generally tapered shape, which can allow for connection elements to be placed about the hose, the initial thickness (E) of the wall 4 can progressively decrease to a final value (e) in the immediate vicinity of the flange 2. This reduction can preferably be a result of the progressive reduction of the thickness of the lifting lining 8 and of the intermediate lifting pad 11.

Figure 5:
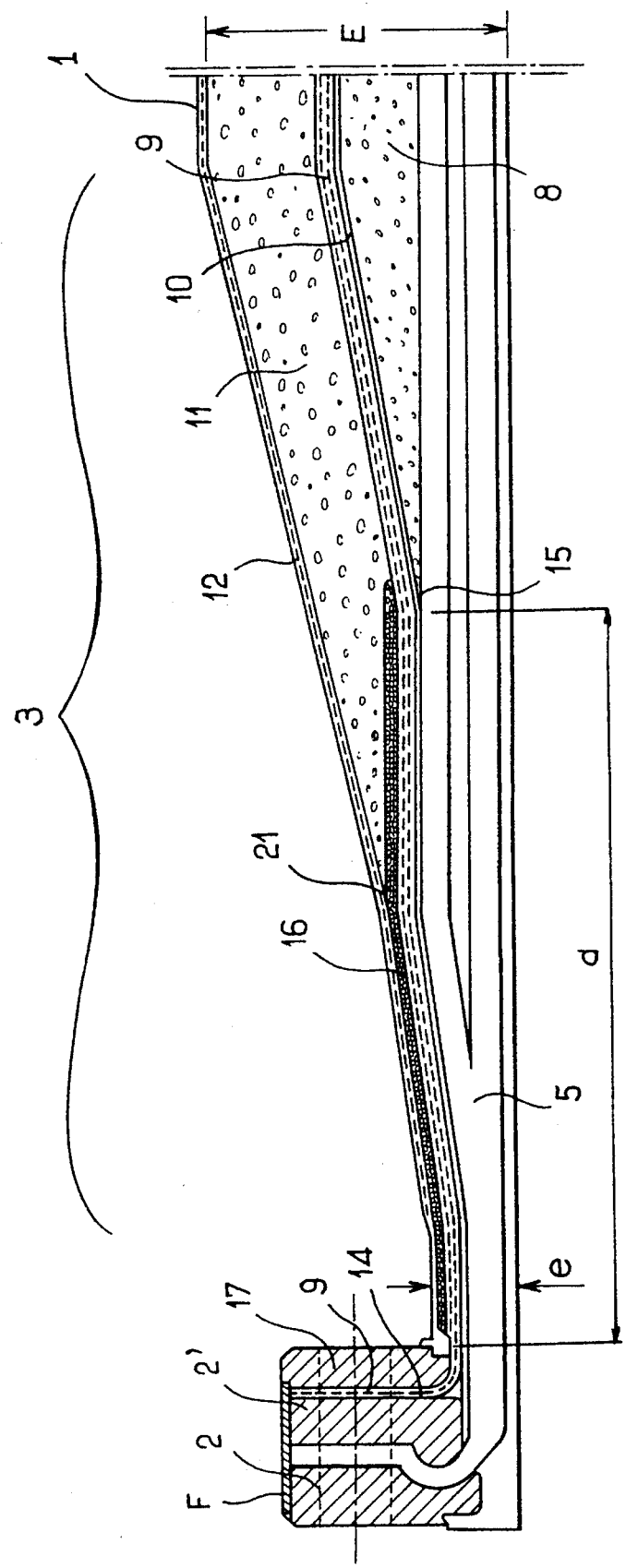
FIG. 5 shows, in a partial longitudinal section, one embodiment of the transient zone for connection of the cylindrical portion of the hose to an end flange.
Figure 6:
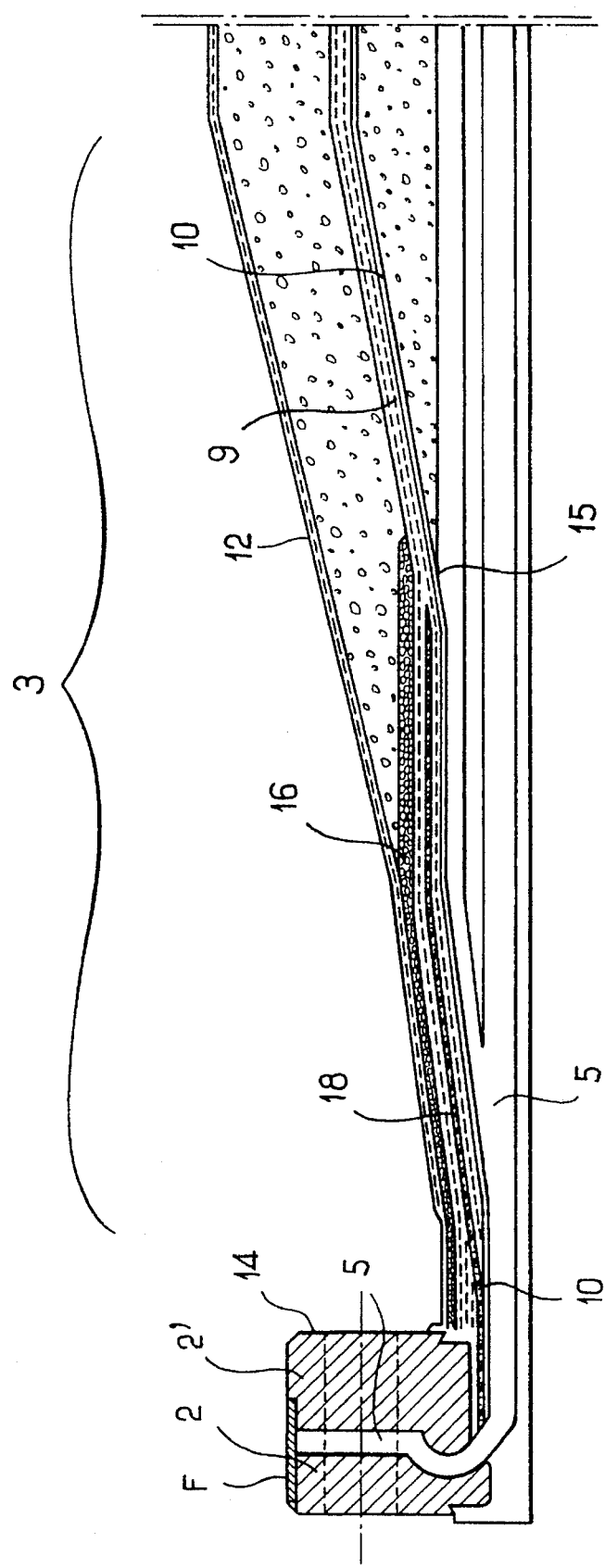
FIG. 6 shows, in partial longitudinal section, an additional embodiment of the transient connecting zone, with a single banding.
Figure 7:
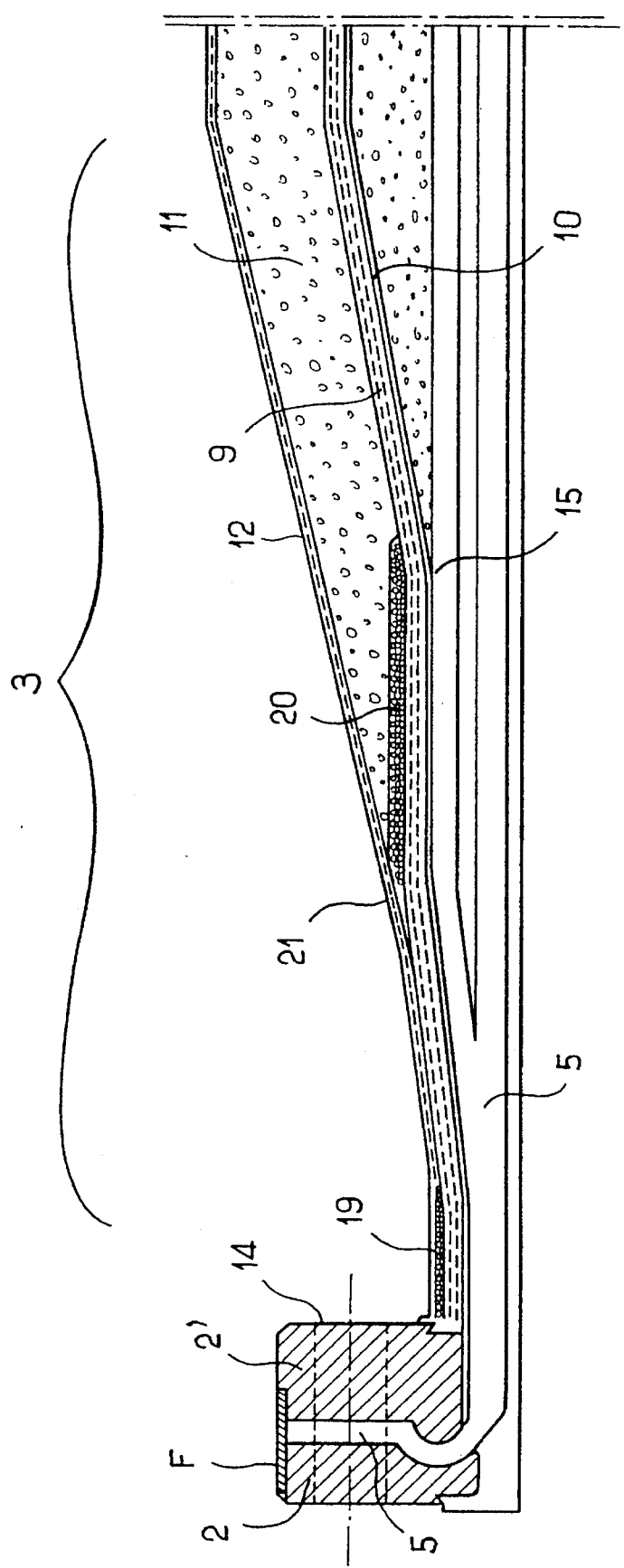
FIG. 7 shows, in partial longitudinal section, an additional embodiment of the transient connecting zone, with two banding elements.

FIGS. 5, 6 and 7 illustrate various structures of the wall 4 of the flexible hose in the transient connecting zones 3 between the cylindrical body 1 of the flexible hose and the flanges 2. In essence, the purpose of the transient connecting zones 3 can preferably be to form a solid connection between the principal reinforcement 5 and the safety reinforcement 9 to realize the connections between the extremities of the flexible hose.

FIG. 5 is a schematic illustration of one embodiment of a terminal connection. In this embodiment of the transient connecting zone 3, in the vicinity of the cylindrical body 1, the lifting lining 8 preferably has a tapered end, the thickness of which tapered end progressively decreases to a value of essentially zero at the level of the line of contact 15 between the principal reinforcement 5 and the safety reinforcement 9. The assembly of the safety reinforcement 9 and the confinement layer 10 essentially contacts the principal reinforcement 5 over the length of the contact line 15 between reinforcements. The shape of the reinforcement 9 thereby takes the exact shape of the upper surface of the contact line over a distance (d) in a region from the origin of contact for the contact line 15 to an additional plate 17. This additional plate 17 can form a part of the flange and is offset from contact with the surface 14 of a mating flange 2'.

In the region along the contact line 15, the principal reinforcement 5 and the safety reinforcement 9 can preferably be connected to one another by gluing the bottom surface of the confinement layer 10 to the upper surface of the principal reinforcement 5, wherein the confinement layer 10 is already adhered to the safety reinforcement 9 as discussed above.

A single radial banding 16 can preferably be placed about the safety reinforcement 9 to hold the safety reinforcement 9 in engagement with the principal reinforcement 5. This banding 16 can preferably be placed exterior to the safety reinforcement 9, and between the safety reinforcement 9 and, on the one hand, the tapered end of the intermediate lifting pad 11, in which the banding can be embedded, and on the other hand, the peripheral covering 12, in the vicinity of the additional plate 17.

The single radial banding 16 can preferably be realized in the form of a transversal winding of preferably at least one of textile or metal cords. This transverse winding can essentially confine potential leaks by means of the confinement layer 10, and can keep the safety reinforcement (9) in preferably intimate contact with the principal reinforcement 5.

In order to provide a continuous confinement layer between flanges at opposite ends of the tubing, the confinement layer 10 can preferably be configured to extend under the mating flange 2', and the confinement layer 10 can be attached to the mating flange 2' by physico-chemical adherence. The confinement layer 10 can thereby provide a sealed casing for the principal reinforcement 5, the extremity of which can be disposed between the flange 2 and the flange 2'.

For additional safety, the extremity of the safety reinforcement 9 can be disposed between the surface 14 of the mating flange 2' and the additional plate 17.

The safety of the flange 2 assembly can also preferably be reinforced by a sealing and tightening element (F), preferably disposed circumferentially around the exterior of the flange assembly. This element (F) can protect the extremities of both the principal reinforcement 5 and the safety reinforcement 9 from contact with the outside environment.

In the variant illustrated in FIG. 6, which also illustrates the terminal connection in the vicinity of the flange 2, the assembly can be further improved by the addition of a mechanically interlocking layer 18, which can be an element which is distinct from the principal reinforcement 5 or its extension.

This layer 18 can preferably be inserted between two constituent elements, or plies, of the safety reinforcement 9, from the contact line 15 between the reinforcements to the vicinity of the mating flange 2', where the layer 18 can join the upper surface of the principal reinforcement 5 to which it can be intimately bonded, either by a physico-chemical adhesive connection, or because it can constitute a natural extension of the reinforcement 5. In other words, the layer 18 can be used to further interconnect the two reinforcement layers 5 and 9 so that the ends of the reinforcement layer 9 can be held in place, thereby allowing for an elongation of the zones (A) when the zones (C) contract in length. It should be remembered that the reinforcement 5 is configured to retain its shape, and in this manner can essentially hold the ends of the reinforcement 9 from being pulled towards one another.

Preferably, the mechanically interlocking layer 18 can be made from an elastomer compound which comprises at least one of: textile or metal reinforcement cords.

As in the preceding variant, the principal reinforcement 5 can be connected to the internal mating flange 2', this variant by the intermediary of the mechanically interlocking layer 18. This arrangement can provide a sealed enclosure of the principal reinforcement 5, by the extension of the confinement layer 10 under the internal mating flange 2'.

The single radial banding 16 depicted in FIG. 6 performs essentially the same function as in the variant described above in FIG. 5.

Also, as in the variant described above in FIG. 5, while not shown in FIG. 6, an additional plate can be connected to the flange 2, to enclose, with the mating flange 2', the extremity of the safety reinforcement 9.

In a similar manner, FIG. 7 illustrates an additional embodiment of a transient connecting zone 3. The embodiment, as depicted in FIG. 7, can essentially be used whether the connection between the principal reinforcement 5 and the safety reinforcement 9, in the region between the contact line 15 between reinforcements and the mating flange 2' is made only by means of the confinement layer 10 as illustrated in FIG. 7, or to which the mechanically interlocking layer 18 has been added, as shown in FIG. 6. In either embodiment, the confinement of fluid leaks which have passed through the principal reinforcement 5, and the maintenance of the reinforcement 5 in intimate contact with the safety reinforcement 9 can be performed in the present variant by a double banding 19, 20.

The double banding can preferably be constituted by an end banding 19 disposed preferably in the vicinity of the mating 2', and an intermediate banding 20 preferably located between the safety reinforcement 9 and the intermediate lifting lining 11. This intermediate banding 20 can preferably be disposed from the vicinity of the contact line 15 between reinforcements to the connection line 21 between the covering 12 and the safety reinforcement 9. The double banding 19, 20 can preferably be formed by transverse windings of at least one of: textile or metal cords.

It should essentially be understood that various elements of the embodiments illustrated in FIGS. 5 to 7 can be combined in other embodiments. It is possible, for example, to combine, with the flange 2 comprising the additional plate 17, the mechanically interlocking layer 18 and/or the double banding constituted by the end banding 19 and the intermediate banding 20. Likewise, the additional plate 17 could be present as shown in FIG. 5, or absent, as shown in FIGS. 6 and 7.

To illustrate the invention in terms of a practical embodiment, the following description relates to an embodiment of a flexible hose of the floating type having a length (L) between flanges 2 of approximately 10 meters, an outside diameter (De) of the cylindrical body 1 of about 650 millimeters, and an inside diameter (Di) of about 400 millimeters. In this embodiment, there are shown two transient connecting zones 3, one at each extremity, each having a unit length of about 650 millimeters, three contractile zones (A) each having a length of about 800 millimeters, four dimensionally invariant zones (B) each having a length of about 600 millimeters, two radial expansion zones (C) each having a length of about 1500 millimeters, and ten connecting zones (D) each having a length of about 90 millimeters.

As discussed earlier, it should generally be understood that the arrangement of the various zones which make up the flexible hose can be varied as a function of the desired effects, and the realization described above is presented only for purposes of illustration. The simplest structure would be composed of one contractile zone (A), one radial expansion zone (C), and two transient connecting zones 3, wherein connecting zones (D) can be provided to preferably connect the various zones to one another. The length of the dimensionally invariant zone B in this case can essentially be considered to be zero.

The realization of such a floating flexible hose in accordance with the present invention can preferably be done in the form of successive layering, over a mandrel having the appropriate dimensions, of at least the following constituents:

First the sealed liner 6, having a thickness in the range of a few millimeters (which when vulcanized could have a thickness of, for example, about 15 mm to about 25 mm).

Then, the principal reinforcement 5 can be placed on top of that, at an angle (mu) of about 36 degrees in relation to the diametral plane of the flexible hose, or alternatively, at the equilibrium angle.

The intermediate layer separating the reinforcements 7 can then be added, and can have a thickness in the range of a few millimeters (which when vulcanized could have a thickness of, for example, about 18 mm to about 13 mm).

On top of that comes the lifting pad 8, which can have a thickness in the range of centimeters (which when vulcanized could have a thickness of, for example, about 4 cm to about 6 cm), and can be made of cellular material which can preferably be chemically inert to the fluid being transported, so that it does not undergo any deterioration in case of the failure of the principal reinforcement 5. The lifting pad 8 can also preferably have a low cohesion, to make possible the dimensional variations of the contractile zones (A) and of the radial expansion zones (C), as well as an improved distribution of the stresses in the dimensionally invariant zones (B).

On top of that can then be wound the confinement layer 10 which can be designed to protect the safety reinforcement 9, which can be placed in contact with the confinement layer 1, against the corrosive action of fluid which may leak through the failed principal reinforcement 5. This confinement layer can preferably be made from a compact elastomer compound, preferably on a natural or synthetic polyisoprene base, and can have a thickness in the range of millimeters (which when vulcanized could have a thickness of, for example, about 5 mm to about 9 mm).

The safety reinforcement 9 can then be placed over that, this reinforcement layer 9 can preferably be made from at least one pair of textile cord plies, preferably polyamide or polyester, and preferably laid at a differential angle as a function of the zones of the flexible hose.

The transversal reinforcement 13 can then be added in the location of the zones (D), which reinforcement essentially has the purpose of providing cohesion of the various plies of the safety reinforcement 9.

Over the safety reinforcement 9, and transversal reinforcements 13 can then be placed the intermediate lifting pad 11, which pad 11 can preferably be made of cellular material of appropriate thickness (which when vulcanized could have a thickness of, for example, about 9 cm to about 11 cm) to provide, in conjunction with the lifting lining 8, the buoyancy of the flexible hose in operation. The material of the intermediate lifting lining 11 can preferably be of the same type and density as that of the lifting pad 8.

Then, once the wall 4 of the cylindrical body 1 has been assembled as indicated above, the process can proceed to the preparation of each transient connecting zone 3, by preferably progressively reducing the thickness of the intermediate lifting pad 11, and the application, by the transversal winding with adjacent turns over the safety reinforcement 9, either of the single radial banding 16, or of the terminal banding 19, and of the intermediate banding 20.

Then, preferably over the intermediate lifting lining 11, a peripheral covering 12 can be placed, which is preferably chemically resistant to the hostile elements in the environment and mechanically resistant to the manipulations experienced during assembly and the impacts caused by floating objects.

The flanges 2 can be installed, when appropriate, during the assembly of the flexible hose.

Vulcanization of the assembly can then be performed by stages in appropriate equipment, such as an autoclave, which under the combined effect of pressure and thermal treatment, can simultaneously cross-link the elastomer compounds and produce an intimate physicochemical bonding of the different components.

In a variant of the realization for a floating flexible hose described above, a flexible hose which can be used as a submersible version can be fabricated under similar conditions. In this case, the thickness of the lifting pad 8 can be reduced to several millimeters, and the lifting lining 8 can be made of a compact material with low cohesion, preferably creating a zone of reduced strength; simultaneously, the intermediate lifting pad 11 can also be made of a layer of a compact elastomer or polymer compound having a thickness in the range of millimeters, and preferably capable of adhering to the safety reinforcement 9 and to the peripheral covering 12.

During normal operation, the flexible hose in accordance with the present invention would preferably be in the shape of a cylinder having the outside diameter (De) of the assembly of the cylindrical body 1 and tapered transient connecting zones 3.

When there is a failure of the principal reinforcement 5, a portion of the fluid being transported escapes toward the wall 4, generating a leak pressure (Pf) in the space between the principal reinforcement 5 and the safety reinforcement 9.

The confinement layer 10 can prevent the penetration of the fluid toward the outermost layers of the wall 4, preferably protecting the safety reinforcement 9 and the intermediate lifting lining 11. As soon as the leak pressure (Pf) reaches the threshold (Vs), on account of the low cohesion of the lifting lining 8, the leak pressure (Pf) can cause localized deformations of the safety reinforcement 9 in the various zones of the flexible hose, deformations which are preferably transmitted to the peripheral covering 12 by means of the intermediate lifting pad 11.

The flexible hose then has the shape of a "caterpillar", formed by a succession of inflated zones and indented zones, where the initial outside diameter (De) of the radial expansion zones (C) can increase by approximately 30%, while the initial outside diameter (De) of the contractile zones (A) can be decreased to approximately 97% of its initial value, which makes possible an immediate visual detection of the malfunction of a flexible hose which has become incapable of performing its functions.

These radial deformations are accompanied by a reduction in length of approximately 20% in the radial expansion zones (C), which offset an elongation on the order of 23% in the contractile zones (A).

The transient connecting zones 3, like the dimensionally invariant zones (B) can retain both their radial and longitudinal dimensions unchanged. In the practical embodiment described above, above the threshold value (Vs) of the leak pressure (Pf), the outside diameter (De) of the radial expansion zones (C) can increase to about 845 millimeters, while the outside diameter of the contractile zones (A) can decrease to about 630 millimeters. The difference between the maximum diameter of the radial expansion zones (C) and the minimum diameter of the contractile zones (A) can thus assume a value of about 215 millimeters, accentuating the visual effect which makes possible an easier detection of the malfunction.

Simultaneously, the reduction in the length of the radial expansion zones (C), which can be about 600 millimeters for the two (C) zones, can be compensated by an increase of length of about 200 millimeters for each of the three contractile zones (A), or about 600 mm total, which thus can make it possible for the length of the flexible hose between the flanges 2 to remain essentially constant.

Without increasing the complexity and thus the cost of the realization, the flexible hose which is the object of the present invention has the following advantages over realizations of the prior art:

earlier visual detection of the malfunction as a result of the localized deformations, as soon as the threshold value (Vs) of the leak pressure of the liquid being transported reaches one-quarter of the service pressure (Ps);

elimination of unnecessary lengths between the loading/unloading point and the vessel, as a result of the compensation of longitudinal deformations; and possibility of fabrication of floating or submersible flexible tubes, using the same principles.

A technician skilled in the art can combine the different structural variants of the flexible hose and of the flanges which are the object of the invention with one another without going beyond the limits of the invention.

One feature of the invention resides broadly in the flexible hose which makes possible the early visual detection of a malfunction, the wall 4 of which has, in the cylindrical body 1, from its innermost part to its outer part, a sealed liner 6, a principal reinforcement 5, an intermediate layer separating the reinforcements 7, a lifting lining 8, a confinement layer 10, a safety reinforcement 9, the structure of which allows a localized deformation in specified zones, at least one of said zones being a radial expansion zone C, an intermediate lifting pad 11 and a peripheral covering 12, said flexible hose characterized:

by the fact that the safety reinforcement is coaxial with the principal reinforcement 5 over its entire length and is kept at a distance from it, in the cylindrical body 1, by a lifting lining 8 of low cohesion, the tear strength of which does not exceed 5 bars and the adherence to the components with which it is in contact does not exceed 5 daN/cm of width, by the fact that it is at least one compensation zone A, B, in which the differential laying angle (alpha, beta) of the safety reinforcement 9 in relation to the equilibrium angle is between −2 and +12 degrees, and by the fact that the localized deformation occurs as soon as the leak pressure (Pf) of the fluid which has passed through the malfunctioning principal reinforcement 5 reaches a threshold value (Vs) which is a fraction of the normal service pressure (Ps).

Another feature of the invention resides broadly in the flexible hose characterized by the fact that the cords of the principal reinforcement 5 are cords which have a high modulus, are made of steel or of aromatic polyamide, and are oriented at a laying angle close to 36 degrees in relation to the diametral plane of said flexible hose.

Still another feature of the invention resides broadly in the flexible hose characterized by the fact that the lifting lining 8 and the intermediate lifting pad 11 are made of a compact elastomer compound, having a thickness in the range of millimeters.

Yet another feature of the invention resides broadly in the flexible hose characterized by the fact that the lifting lining 8 is constituted partly by a fabric which locally does not have an adhesive treatment.

Another feature of the invention resides broadly in the flexible hose characterized by the fact that the lifting lining 8 is constituted partly by a thin polymer film of polyethylene, polypropylene or polyester.

A further feature of the invention resides broadly in the flexible hose characterized by the fact that the lifting lining 8 and the intermediate lifting pad 11 are made of a cellular compound having a thickness in the range of centimeters and a density between 30 and 70 kg/m3.

Yet another feature of the invention resides broadly in the flexible hose characterized by the fact that at least one compensation zone is formed by a contractile zone A in which the differential laying angle (alpha) of the safety reinforcement 9 is between +3 and +12 degrees, and by a dimensionally invariant zone B in which the differential laying angle (beta) of the safety reinforcement 9 is between −2 and +2 degrees.

Still another feature of the invention resides broadly in the flexible hose characterized by the fact that the compensation zone is formed by the contractile zones A only.

Another feature of the invention resides broadly in the flexible hose characterized by the fact that, in the connecting zones D, the assembly of the plies of the safety reinforcement 9 comprises a transversal reinforcement 13 consisting of a winding of cords orthogonal to the longitudinal axis (XX') of the flexible hose and embedded in the intermediate lifting pad 11.

A further feature of the invention resides broadly in the flexible hose characterized by the fact that the threshold value (Vs) of the leak pressure (Pf) is equal to one-quarter of the operating pressure (Ps) and in each radial expansion zone C causes a radial swelling to a value of 130% of its initial diameter (De) accompanied by an approximately 20% reduction in length, and in each contractile zone A, a reduction of the diameter to approximately 97% of its initial value (De), accompanied by an elongation of approximately 23%, which compensates for the reduction of length of the radial expansion zone C.

Yet another feature of the invention resides broadly in the flexible hose characterized by the fact that, in each transient connecting zone 3, a single radial banding 16, constituted by a winding of textile or metal cords orthogonal to the longitudinal axis (XX') of the flexible hose, encloses the safety reinforcement 9 to ensure its intimate contact with the confinement layer 10 and the principal reinforcement 5.

Still another feature of the invention resides broadly in the flexible hose characterized by the fact that the banding of the principal reinforcement 5 and of the safety reinforcement 9 is formed by a terminal banding 19 and by an intermediate banding 20.

Another feature of the invention resides broadly in the flexible hose characterized by the fact that a mechanically interlocking layer 18 is inserted between two constituent elements of the safety reinforcement 9, from the contact line 15 between reinforcements to the inside surface of the mating flange 2', where it joins the upper surface of the principal reinforcement 5.

A further feature of the invention resides broadly in the flexible hose characterized by the fact that the mechanically interlocking layer 18 is the elongation of the principal reinforcement 5.

Still another feature of the invention resides broadly in the flexible hose characterized by the fact that the flange 2 comprises a mating flange 2' which encloses the free end of the principal reinforcement 5 and an additional plate 17 which encloses the free end of the safety reinforcement 9, the confinement layer 10 being elongated to underneath the internal part of the mating flange 2', and by the fact that a sealing enclosure F is placed circumferentially over said flange 2.

Some examples of types of tubings which have reinforcements disposed therein are shown by the following U.S. Patents which are meant to provide background information only, as the disclosed patents fall outside of the field of the present invention: U.S. Pat. No. 4,110,061 to Gerritsen, entitled "Peristaltic Pump Having Particularly Reinforced Hose"; U.S. Pat. No. 4,225,158 to Puechavy, entitled "Flexible Hoses"; and U.S. Pat. No. 4,467,835 to Champieboux entitled "Shut-Off Devices".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the U.S. patents recited herein are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A flexible, fluid-transporting hose for the transport of fluids therethrough in a predetermined range of fluid pressures, said flexible hose comprising:

a first liner defining a fluid passage through the hose;

a second liner disposed circumferentially about said first liner;

said second liner comprising a containment liner for containing fluid under pressure leaking through said first liner at a leakage pressure, said second liner comprising an outer diameter;

said second liner comprising means for permitting deformation of at least a first portion of said second liner, upon leakage of fluid through said first liner, to increase the outer diameter of said at least a first portion of said second liner;

said first liner and said second liner having an adherence to one another, said adherence being in a range of adherence values; and said range of adherence values comprising adherence values for permitting separation of said second liner from said first liner at a leakage pressure substantially less than the fluid pressures within the predetermined range of fluid pressures.

2. The flexible hose according to claim 1, wherein:

said first liner comprises first reinforcement means for reinforcing said first liner, said first reinforcement means having a first configuration in the absence of fluid leaking through said first liner, and said first reinforcement means being configured for maintaining a substantially constant first configuration during transport of fluid through the hose;

said means for permitting deformation of said second liner comprises second reinforcement means for reinforcing said containment liner;

said range of adherence values comprising adherence values for permitting separation of said second liner from said first liner at a leakage pressure of up to about one-fourth of the fluid pressures within said predetermined range of fluid pressures; and said second reinforcement means being configured for deforming under said leakage pressure of up to about one-fourth of the fluid pressures within said predetermined range of fluid pressures.

3. The flexible hose according to claim 2, further including said range of adherence values being less than about 5 daN/cm.

4. The flexible hose according to claim 3, wherein:

said second reinforcement means comprises at least one first portion, said at least one first portion of said second reinforcement means being configured for permitting radial expansion of said at least a portion of said second liner upon leakage of fluid under pressure through said first liner; and said second reinforcement means comprises at least one second portion, said at least one second portion of said second reinforcement means being configured for at least preventing the outer diameter of said second liner, along said at least one second portion of said second reinforcement means, from substantially expanding upon leakage of fluid under pressure through said first liner.

5. The flexible hose according to claim 4, wherein:

said flexible hose has a longitudinal axis and defines a plane substantially perpendicular to the longitudinal axis;

said first and second and second reinforcement means each comprise cords disposed spirally about the longitudinal axis;

said cords of said second reinforcement means along said at least one first portion of said second reinforcement means are disposed at an angle of between about 39° and about 48° with respect to the plane;

said cords of said second reinforcement means along said at least one second portion of said second reinforcement means are disposed at an angle of between about 24° and about 38° with respect to the plane; and said cords of said first reinforcement means are disposed at an angle of about 36° with respect to the plane.

6. The flexible hose according to claim 5, wherein:

said at least one second portion of said second reinforcement means comprises a first type of second portion and a second type of second portion, and said flexible hose comprises at least one of each of said first and second types of second portions;

said first type of second portion having cords disposed at an angle of between about 24° and about 33° with respect to the plane;

said second type of second portion having cords disposed at an angle of between about 34° to about 38° with respect to the plane;

each of said at least one first portion, said first type of second portion and said second type of second portion of said second reinforcement means having a first length in the absence of fluid leaking through said first liner, and a second length upon fluid leaking through said first liner at said leakage pressure of at least one-fourth of the fluid pressures within said range of pressures;

each of said at least one first portion, said first type of second portion and said second type of second portion of said second reinforcement means having a first diameter in the absence of fluid leaking through said first liner, and a second diameter upon fluid leaking through said first liner at said leakage pressure of at least one-fourth of the fluid pressures within said range of pressures;

for said at least one first portion, said second length being about 20% less than said first length, and said second diameter being about 30% greater than said first diameter;

for said first type of second portion, said second length being about 23% greater than said first length, and said second diameter being about 97% of said first diameter; and for said second type of second portion, said second length being substantially the same as said first length, and said second diameter being substantially the same as said first diameter.

7. The flexible hose according to claim 6, wherein:

said first liner comprises:
 a first tubular member defining the fluid passage through the hose, said first tubular member comprising a material substantially chemically inert to the fluid being transported therethrough; and
 said first reinforcement means disposed adjacent to and radially outward from said first tubular member;

said containment liner comprises a material substantially chemically inert to the fluid being transported through the hose;

said second liner comprises said second reinforcement means disposed adjacent to and radially outward from said containment liner;

said second liner additionally comprises a second tubular member disposed between said containment liner and said first liner, said second tubular member comprising a material having a low cohesion with a tear strength of less than 5 bars;

said material of said second tubular member being selected to have an adherence of less than about 5 daN/cm of width to said first liner and to said containment liner;

the flexible hose has an exterior surface; and said second liner additionally comprises a tubular cover member forming the exterior surface of the flexible hose, said cover member comprising a material configured for protecting said flexible hose from external damage.

8. The flexible hose according to claim 7, wherein:

said cords of each of said first and second reinforcement means each comprise at least one pair of corded plies;

said cords of each pair of corded plies of said first reinforcement means being disposed in opposing spiral directions about the longitudinal axis of said hose at said angle of about 36° with respect to the plane;

said cords of each pair of corded plies of said second reinforcement means being disposed in opposing spiral directions about the longitudinal axis of said hose at:
 said angle of between about 34° to about 36° with respect to the plane, in said second type of second portion;
 said angle of between about 39° and about 48° with respect to the plane, in said at least one first portion; and
 said angle of between about 24° and about 33° with respect to the plane, in said first type of second portion;

said first liner comprises a third tubular member disposed radially outward from said reinforcement means of said first liner adjacent said second tubular member of said second liner, said third tubular member comprising a material having an adherance of less than about 5 daN/cm width to said second tubular member;

said second liner comprises a fourth tubular member disposed radially outwardly from said reinforcement means of said second liner between said reinforcement means of said second liner and said cover member;

said flexible hose further comprises a connection zone disposed between adjacent ones of said at least one first portion, said first type of second portion and said second type of second portion of said second reinforcement means, said connection zone comprising:
 overlapping cords of said adjacent zones; and
 means for connecting the cords of adjacent zones with one another; and said means for connecting comprising cords disposed circumferentially about said flexible hose radially outwardly of said overlapping cords, said circumferential cords being configured to maintain intimate contact between the overlapping cords of said adjacent zones.

9. The flexible hose according to claim 8, wherein:

said flexible hose has a first end, a second end, a first end portion adjacent the first end, a second end portion adjacent the second end, and a body portion between the first end portion and the second end portion;

each of said first end and said second end comprise a flange for connecting said flexible hose to at least another flexible hose;

said first and second end portions each have a first diameter adjacent said body portion and a second diameter adjacent said flange, said first diameter being greater than said second diameter;

said second and fourth tubular members having conical end portions in said first and second end portions of the flexible hose;

said second tubular member having a thickness, said thickness tapering to zero from said body portion towards said first and second ends of the hose at a first area disposed a first distance from said flange at each of said first and second ends, said containment liner and said second reinforcement means coming into intimate contact with said third tubular member and said first reinforcement means at said first area;

each of said first and second end portions comprising at least one winding of cords wound circumferentially about said second reinforcement means to maintain said second reinforcement means in intimate contact with said first reinforcement means;

said flange of each of said first and second ends of the flexible hose extends radially away from the flexible hose, and each flange comprises two radially extending flange portions, with a first of the flange portions being disposed at an end of the hose, and a second being disposed towards the hose body portion;

said first reinforcement means has first and second ends at respective ones of said first and second ends of the flexible hose;

said two flange portions being configured for enclosing one of the first and second ends of said first reinforcement means therebetween;

said containment liner has first and second ends at respective ones of said first and second ends of the flexible hose, and said first and second ends of said containment liner are disposed radially inwardly of said second flange portions;

said first and second flange portion each comprise a peripheral surface disposed circumferentially therearound; and said first and second ends of said hose further comprise cylindrical bands disposed about the peripheral surface of said first and second flange portions to protect the reinforcement means disposed between said first and second flange portions.

10. The flexible hose according to claim 9, wherein:

said flexible hose comprises a flexible hose for transporting oil through seawater;

each said flange comprises a third flange portion disposed adjacent said second flange portion;

said second reinforcement means has first and second ends at respective ones of said first and second ends of the flexible hose;

said second flange portion and said third flange portion being configured for enclosing one of said first and second ends of said second reinforcement means;

said fourth tubular member having a thickness, said thickness tapering to zero from said body portion towards said first and second ends of the hose at a second area disposed a second distance from each said flange, said second reinforcement means coming into intimate contact with said cover member at said second area, and said second distance for said second area being less than said first distance for said first area;

said at least one winding of cords wound circumferentially about said second reinforcement means at said first and second end portions of the flexible hose comprises at least first and second windings of cords wound circumferentially about said second reinforcement means, said first and second windings of cords being separate from one another;

said first winding of cords being disposed adjacent said flange, and said second winding of cords being spaced apart from said first winding and disposed substantially between said first and second areas;

said first and second end portions further comprise an interlocking member, said interlocking member having a first end bonded to said first reinforcement means, and a second end disposed between said plies of said at least one pair of plies of said second reinforcement means, to interlock said first and second reinforcement means;

said interlocking member comprising one of:
  a member separate from said first reinforcement means; and
  an extension of one of the corded plies of said first reinforcement means folded back along said first reinforcement means;

said material of said first tubular member comprises a butadiene-acrylonitrile copolymer based elastomer;

said cords of said corded plies of both said first and second reinforcement means of said first liner and said reinforcement means of said containment liner comprise at least one of:
  metal cords, textile cords, aromatic polyamide cords and polyester cords;

said material of both said containment liner and said third tubular member comprises a natural or synthetic polyisoprene based elastomer;

said material of said second tubular member and said fourth tubular member comprise one of:
  a compact elastomer compound comprising one of: polyethylene, polypropylene, and polyester;
  a fabric comprising a thin film of one of: polyethylene, polypropylene, and polyester; and
  a cellular material having a density between about 30 $kg/m^3$ and about 70 $kg/m^3$;

said material of said cover member comprises a polychloroprene based elastomer having textile or metal reinforcement cords;

said flexible hose has a length of about 10 meters;

said flexible hose comprises:
  two of said first portions;
  three of said first type of second portion; and
  four of said second type of second portion;

each of said first portions having a first length of about 1500 mm;

each of said first type of second portions having a first length of about 800 mm;

each of said second type of second portions having a first length of about 600 mm;

each of said first portions, and said second portions having a first diameter of about 650 mm;

said first tubular member defining an inner diameter of the flexible hose of about 400 mm; and said first and second end portions each have a length of about 650 mm;

each of said connection zones having a length of about 90 mm;

said first tubular member has a thickness of between about 15 mm to about 25 mm;

said second tubular member has a thickness of between about 4 cm to about 6 cm;

said third tubular member has a thickness of between about 8 mm to about 13 mm;

said containment liner has a thickness of between about 5 mm to about 9 mm; and said fourth tubular member has a thickness of between about 9 cm to about 11 cm.

11. A flexible, fluid-transporting hose for the transport of fluids therethrough in a predetermined range of fluid pressure, said flexible hose having a length, said flexible hose comprising:

a first liner defining a fluid passage through the hose;

a second liner disposed circumferentially about said first liner;

said second liner comprising a containment liner for containing fluids leaking under pressure through said first liner;

said second liner having a base configuration in the absence of fluids leaking through said first liner;

said second liner comprising reinforcement means for reinforcing said containment liner;

said reinforcement means having at least one first portion, said at least one first portion being configured for permitting radial expansion of said second liner, along said at least one first portion, upon leakage of fluid under pressure through said first liner at a fluid leakage pressure; and said reinforcement means having at least one second portion, said at least one second portion comprising means for elongating at least said at least one second portion to maintain the length of the flexible hose substantially constant upon leakage of fluid under pressure through said first liner.

12. The flexible hose according to claim 11, wherein:

said flexible hose has a longitudinal axis and defines a plane substantially perpendicular to the longitudinal axis;

said reinforcement means comprises cords disposed spirally about the longitudinal axis, said cords comprise cords disposed along said at least one first portion, and cords disposed along said at least one second portion;

said cords along said at least one first portion are disposed at an angle of between about 39° and about 48° with respect to the plane; and said cords along said at least one second portion are disposed at an angle of between about 24° and about 38° with respect to the plane, said configuration of said cords along said at least one second portion comprising said means for maintaining the length of the hose substantially constant.

13. The flexible hose according to claim 12, wherein:

said at least one second portion comprises a first type of second portion and a second type of second portion, and said flexible hose comprises at least one of each of said first and second types of second portions;

said first type of second portion having cords disposed at an angle of between about 24° and about 33° with respect to the plane; and said second type of second portion having cords disposed at an angle of between about 34° to about 38° with respect to the plane.

14. The flexible hose according to claim 13, wherein:

each of said at least one first portion, said first type of second portion and said second type of second portion having a first length in the base configuration of said flexible hose and a second length upon fluid leaking through said first liner;

each of said at least one first portion, said first type of second portion and said second type of second portion having a first diameter in the base configuration of said flexible hose and a second diameter upon fluid leaking through said first liner;

for said at least one first portion, said second length being less than said first length, and said second diameter being greater than said first diameter;

for said first type of second portion, said second length being greater than said first length, and said second diameter being less than said first diameter; and for said second type of second portion, said second length being substantially the same as said first length, and said second diameter being substantially the same as said first diameter.

15. The flexible hose according to claim 14, wherein:

said containment liner comprises a material substantially chemically inert to the fluid being transported;

said first liner comprises:
  a first tubular member defining the fluid passage through the hose, said first tubular member comprising a material substantially chemically inert to the fluid being transported; and
  reinforcement means disposed in conjunction with said first tubular member to strengthen said first tubular member, said reinforcement means comprising cords disposed at an angle of about 36° with respect to the plane;

said second liner additionally comprises a second tubular member disposed between said containment liner and said first liner said second tubular member comprising a material having a low cohesion with a tear strength of less than 5 bars;

said material of said second tubular member being selected to have an adherence of less than about 5 daN/cm of width to said first liner and said containment liner; and said second liner additionally comprises a tubular cover member configured for protecting said flexible hose from external damage.

16. The flexible hose according to claim 15, wherein:

said reinforcement means of said first liner and of said second liner each comprise at least one pair of corded plies disposed radially outwardly of said first tubular member and said containment liner respectively;

said cords of each pair of corded plies of said reinforcement means of said first liner being disposed in opposing spiral directions about the longitudinal axis of said hose at said angle of about 36° with respect to the plane;

said cords of each pair of corded plies of said reinforcement means of said second liner being disposed in opposing spiral directions about the longitudinal axis of said hose at:
  said angle of between about 34° to about 36° with respect to the plane, in said second type of second portion;
  said angle of between about 39° and about 48° with respect to the plane, in said at least one first portion; and
  said angle of between about 24° and about 33° with respect to the plane, in said first type of second portion;

said first liner comprises a third tubular member disposed radially outward from said reinforcement means of said first liner adjacent said second tubular member of said second liner said third tubular member and said containment liner each comprising a material having an adherance of less than about 5 daN/cm width to said second tubular member;

said second liner comprises a fourth tubular member disposed radially outwardly from said reinforcement means of said second liner between said reinforcement means of said second liner and said cover member;

said flexible hose further comprises a connection zone disposed between adjacent ones of said at least one first portion, said first type of second portion and said second type of second portion, said connection zone comprising:

overlapping cords of said adjacent zones; and means for connecting the cords of adjacent zones with one another;

said means for connecting comprising cords disposed circumferentially about said flexible hose radially outwardly of said overlapping cords, said circumferential cords being configured to maintain intimate contact between the overlapping cords of said adjacent zones.

17. The flexible hose according to claim 16, further including:

for said at least one first portion, said second length being about 20% less than said first length, and said second diameter being about 30% greater than said first diameter;

for said first type of second portion, said second length being about 23% greater than said first length, and said second diameter being about 97% of said first diameter; and for said second type of second portion, said second length being substantially the same as said first length, and said second diameter being substantially the same as said first diameter.

18. The flexible hose according to claim 17, wherein:

said flexible hose has a first end, a second end, a first end portion adjacent said first end, a second end portion adjacent said second end, and a body portion between the first end and the second end;

each of said first end and said second end comprise a flange for connecting said flexible hose to at least another flexible hose;

said first and second end portions each have a first diameter adjacent said body portion and a second diameter adjacent said flange, said first diameter being greater than said second diameter;

said second and fourth tubular members having conical end portions in said first and second end portions of the flexible hose;

said second tubular member having a thickness, said thickness tapering to zero from said body portion towards said first and second ends of the hose at a first area disposed a first distance from said flange, said containment liner and said second reinforcement means coming into intimate contact with said third tubular member and said reinforcement means of said first liner at said first area;

each of said first and second end portions comprising at least one winding of cords wound circumferentially about said reinforcement means of said second liner to maintain said reinforcement means of said second liner in intimate contact with said reinforcement means of said first liner;

said flange of each of said first and second ends of the flexible hose extends radially away from the flexible hose, and each said flange comprises two radially extending flange portions, with a first of the flange portions being disposed at one of the first and second ends of the hose, and a second of the flange portions being disposed towards the hose body portion;

said reinforcement means of said first liner has first and second ends, respectively at said first and second ends of the flexible hose;

said two flange portions being configured for enclosing one of the first and second ends of said reinforcement means of said first liner therebetween;

said containment liner has first and second ends, and said first and second ends of said containment liner are disposed radially inwardly of said second flange portions;

said first and second flange portions each comprise a peripheral surface disposed circumferentially therearound; and said first and second ends of said hose further comprise cylindrical bands disposed about the peripheral surface of said first and second flange portions to protect the reinforcement means of said first liner disposed between said first and second flange portions.

19. The flexible hose according to claim 18, wherein:

said flange comprises a third flange portion disposed adjacent said second flange portion;

said reinforcement means of said second liner has first and second ends at said first and second ends of the flexible hose;

said second flange portion and said third flange portion being configured for enclosing one of the first and second ends of said reinforcement means of said second liner;

said fourth tubular member having a thickness, said thickness tapering to zero from said body portion towards said first and second ends of the hose at a second area disposed a second distance from said flange, said reinforcement means of said second liner coming into intimate contact with said cover member at said second area, and said second distance for said second area being less than said first distance for said first area;

said at least one winding of cords wound circumferentially about said reinforcement means of said second liner at said first and second end portions of the flexible hose comprises at least first and second windings of cords wound circumferentially about said reinforcement means of said second liner means, said first and second windings of cords being separate from one another;

said first winding being disposed adjacent said flange means, and said second winding being spaced apart from said first winding and disposed substantially between said first and second areas;

said first and second end portions further comprise an interlocking member, said interlocking member having a first end bonded to said reinforcement means of said first liner, and a second end disposed between said plies of said at least one pair of corded plies of said reinforcement means of said second liner to interlock said reinforcement means of both said first and second liners;

said interlocking member comprising one of:
- a member separate from said reinforcement means of said first liner; and
- an extension of one of the corded plies of said reinforcement means of said first liner folded back along said reinforcement means of said first liner.

20. The flexible hose according to claim 19, wherein:

said flexible hose comprises a flexible hose for transporting oil through seawater;

said material of said first tubular member comprises a butadiene-acrylonitrile copolymer based elastomer;

said cords of said corded plies of both said reinforcement means of said first liner and said second liner comprise at least one of:
- metal cords, textile cords, aromatic polyamide cords and polyester cords;

said material of both said containment liner and said third tubular member comprises a natural or synthetic polyisoprene based elastomer;

said material of said second tubular member and said fourth tubular member comprise one of:
- a compact elastomer compound comprising one of: polyethylene, polypropylene, and polyester;
- a fabric comprising a thin film of one of: polyethylene, polypropylene, and polyester; and
- a cellular material having a density between about 30 kg/m$^3$ and about 70 kg/m$^3$;

said material of said cover member comprises a polychloroprene based elastomer having textile or metal reinforcement cords;

said flexible hose has a length of about 10 meters;

said flexible hose comprises:
- two of said first portions;
- three of said first type of second portion; and
- four of said second type of second portion;

said flexible hose comprises, in order, said first end portion, one of said first type of second portion, one of said second type of second portion, one of said first portions, one of said second type of second portion, one of said first type of second portion, one of said second type of second portion, one of said first portions, one of said second type of second portion, one of said first type of second portion, and said second end portion;

each of said first portions having a first length of about 1500 mm;

each of said first type of second portions having a first length of about 800 mm;

each of said second type of second portions having a first length of about 600 mm;

each of said first portions, and said second portions having a first diameter of about 650 mm;

said first tubular member defining an inner diameter of the flexible hose of about 400 mm; and said first and second end portions each have a length of about 650 mm;

each of said connection zones having a length of about 90 mm;

said first tubular member has a thickness of between about 15 mm to about 25 mm;

said second tubular member has a thickness of between about 4 cm to about 6 cm;

said third tubular member has a thickness of between about 8 mm to about 13 mm;

said containment liner has a thickness of between about 5 mm to about 9 mm; and said fourth tubular member has a thickness of between about 9 cm to about 11 cm.

* * * * *

UNITED STATES PATENT AND TRADEMARK OFFICE
CERTIFICATE OF CORRECTION

PATENT NO. : 5,518,034
DATED : May 21, 1996
INVENTOR(S) : Bernard RAGOUT, Charles MOREAU and David MAYAU It is certified that error appears in the above-indentified patent and that said Letters Patent is hereby corrected as shown below:

In column 5, line 3, after '(Pf),', delete "an" and insert --can--.

In column 6, line 10, after 'axis', delete "(X-X)," and insert --(X-X'),--.

In column 6, line 17, after 'axis', delete "(X-X)" and insert --(X-X')--.

In column 8, line 63, after 'axis', delete "(X-X)" and insert --(X-X')--.

In column 12, line 27, after ' 1', ' insert --in--.

In column 19, line 1, Claim 5, after the first occurrence of 'second' delete "and second".

In column 24, line 34, Claim 15, after 'first', delete "liner" and insert --liner,--.

In column 24, line 48, Claim 16, after 'containment', delete "liner" and insert --liner,--.

In column 25, line 4, Claim 16, after 'second', delete "liner" and insert --liner,--.

In column 26, line 52, Claim 19, after 'liner' delete "means".

UNITED STATES PATENT AND TRADEMARK OFFICE
CERTIFICATE OF CORRECTION

PATENT NO.   : 5,518,034
DATED        : May 21, 1996
INVENTOR(S)  : Bernard RAGOUT, Charles MOREAU and David MAYAU It is certified that error appears in the above-indentified patent and that said Letters Patent is hereby corrected as shown below:

In column 26, line 56, Claim 19, before the comma delete "means".

In column 18, line 48, Claim 4, after 'claim', delete "3," and insert --2,--.

Signed and Sealed this

Eighteenth Day of March, 1997

Attest:

BRUCE LEHMAN

Attesting Officer          Commissioner of Patents and Trademarks